(12) United States Patent
Dagley et al.

(10) Patent No.: US 12,105,758 B2
(45) Date of Patent: Oct. 1, 2024

(54) METHODS AND SYSTEMS FOR FILTERING VEHICLE INFORMATION

(71) Applicant: Capital One Services, LLC, McLean, VA (US)

(72) Inventors: Geoffrey Dagley, McKinney, TX (US); Qiaochu Tang, The Colony, TX (US); Avid Ghamsari, Plano, TX (US); Micah Price, Plano, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/936,002

(22) Filed: Sep. 28, 2022

(65) Prior Publication Data

US 2023/0016970 A1    Jan. 19, 2023

Related U.S. Application Data

(63) Continuation of application No. 16/943,845, filed on Jul. 30, 2020, now Pat. No. 11,494,442, which is a continuation of application No. 16/373,739, filed on Apr. 3, 2019, now Pat. No. 10,740,405.

(51) Int. Cl.
*G06F 16/9035* (2019.01)
*G06F 16/9032* (2019.01)
*G06F 16/9038* (2019.01)

(52) U.S. Cl.
CPC .... *G06F 16/9035* (2019.01); *G06F 16/90328* (2019.01); *G06F 16/9038* (2019.01)

(58) Field of Classification Search
CPC ............. G06F 16/9035; G06F 16/9038; G06F 16/90328

USPC ......................................................... 707/766
See application file for complete search history.

(56) References Cited

U.S. PATENT DOCUMENTS

| | | | |
|---|---|---|---|
| 6,728,706 B2 | 4/2004 | Aggarwal et al. | |
| 8,156,125 B2* | 4/2012 | Annau | G06F 16/332 |
| | | | 707/731 |
| 9,652,534 B1* | 5/2017 | Narayanan | G06F 16/951 |
| 10,013,083 B2* | 7/2018 | Amariutei | G06F 3/0304 |
| 10,268,704 B1* | 4/2019 | Sanderson | G06F 16/278 |
| 2007/0192166 A1* | 8/2007 | Van Luchene | G06Q 30/02 |
| | | | 705/14.54 |

(Continued)

FOREIGN PATENT DOCUMENTS

KR        20200021829 A  *  8/2018

*Primary Examiner* — Grace Park
*Assistant Examiner* — Abdullah A Daud
(74) *Attorney, Agent, or Firm* — Bookoff McAndrews, PLLC

(57) ABSTRACT

Disclosed are methods, systems, and non-transitory computer-readable medium for filtering vehicle information. For instance, the method may include receiving a vehicle search request from a user device, the vehicle search request including conditions with corresponding weights. The method may also include, in response to receiving the vehicle search request, forming a search query based on the conditions and the weights of the vehicle search request; obtaining vehicle information; filtering the vehicle information based on the search query to obtain a result set and a partial match set; and transmitting a search result message based on the result set and the partial match set to the user device.

20 Claims, 9 Drawing Sheets

(56) References Cited

U.S. PATENT DOCUMENTS

| | | | |
|---|---|---|---|
| 2012/0095987 A1* | 4/2012 | Cheng | G06F 16/24535 707/E17.001 |
| 2012/0280030 A1* | 11/2012 | Hashimoto | G06Q 20/3276 235/375 |
| 2013/0006916 A1 | 1/2013 | McBride et al. | |
| 2013/0103680 A1* | 4/2013 | Arrasvuori | G06F 16/332 707/769 |
| 2014/0359023 A1* | 12/2014 | Homsany | H04L 12/1831 709/206 |
| 2015/0058059 A1* | 2/2015 | Kahan | G06F 3/0482 705/7.19 |
| 2015/0310107 A1* | 10/2015 | Alhakimi | G06F 16/41 707/711 |
| 2017/0091239 A1* | 3/2017 | Bumbulis | G06F 16/245 |
| 2017/0223124 A1* | 8/2017 | Dhawan | H04N 19/436 |
| 2017/0255682 A1* | 9/2017 | Pounds | G06F 16/24552 |
| 2017/0345014 A1* | 11/2017 | Kochura | G06F 40/30 |
| 2018/0113200 A1* | 4/2018 | Steinberg | G01S 7/4918 |
| 2018/0129729 A1* | 5/2018 | Moskwinski | G06F 16/9024 |
| 2018/0260450 A1* | 9/2018 | Wang | G06F 16/248 |
| 2019/0197605 A1* | 6/2019 | Sadler | G06F 16/90335 |
| 2019/0294977 A1* | 9/2019 | Kunde | G06F 16/9035 |

\* cited by examiner

*FIG. 1C*

METHODS AND SYSTEMS FOR FILTERING VEHICLE INFORMATION

CROSS-REFERENCE TO RELATED APPLICATION(S)

This patent application is a continuation of and claims the benefit of priority to U.S. Nonprovisional patent application Ser. No. 16/943,845, filed on Jul. 30, 2020, which is a continuation of U.S. Nonprovisional patent application Ser. No. 16/373,739, filed on Apr. 3, 2019, the entireties of all of which being incorporated herein by reference.

TECHNICAL FIELD

Various embodiments of the present disclosure relate generally to methods and systems for filtering vehicle information and, more particularly, to methods and systems for filtering vehicle information based on conditions and weights of a vehicle search request.

BACKGROUND

Generally, vehicle filtering relies on binary value matching of attributes (e.g., a vehicle either has a value of an attribute or it doesn't). For instance, binary value matching may only return vehicles with a price (as an attribute) below a given value (e.g., $30,000). Therefore, when a user is searching for a vehicle, the user may have many attributes that the user may want the vehicle to match. While searching, the user may determine that some of the attributes are more important to the user than other attributes. For the other attributes, the user may be more flexible as to whether the vehicle includes or fails to include the respective attribute. For instance, a user may prefer that the vehicle must be under $30,000, but the vehicle could be less than 45,000 miles, and the vehicle may or may not be red, etc. However, binary value matching makes searching for vehicles difficult with attributes that may be flexible to the user. For instance, binary value matching may have the effect of excluding vehicles that may be considered acceptable to the user.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for filtering vehicle information.

For instance, a method for filtering vehicle information may include receiving a vehicle search request from a user device, the vehicle search request including conditions with corresponding weights; in response to receiving the vehicle search request, forming a search query based on the conditions and the weights of the vehicle search request; obtaining vehicle information; filtering the vehicle information based on the search query to obtain a result set and a partial match set; and transmitting a search result message based on the result set and the partial match set to the user device.

A system may include a memory storing instructions; and a processor executing the instructions to perform a process. The process may include: receiving a vehicle search request from a user device, the vehicle search request including conditions with corresponding weights; in response to receiving the vehicle search request, forming a search query based on the conditions and the weights of the vehicle search request by: extracting the conditions and the weights from the vehicle search request, obtaining search query rules, and generating the search query by applying the search query rules to the conditions and the weights; obtaining vehicle information, the vehicle information including a plurality of vehicle data sets, the plurality of the vehicle data sets corresponding to a plurality of vehicles, each of the plurality of vehicle data sets including vehicle attributes for each of the plurality of vehicles; filtering the vehicle information based on the search query to obtain a result set and a partial match set, the result set including vehicle data sets that match the conditions, the partial match set including vehicle data sets that have vehicle attributes that do not match at least one condition and do match at least one other condition of the conditions; generating a search result message based on the result set and the partial match set; and transmitting the search result message to the user device.

In a further example, a method for filtering vehicle information may include receiving a vehicle search request from a user device, the vehicle search request including conditions with corresponding weights; in response to receiving the vehicle search request, forming a search query based on the conditions and the weights of the vehicle search request; obtaining vehicle information, the vehicle information including a plurality of vehicle data sets, the plurality of the vehicle data sets corresponding to a plurality of vehicles, each of the plurality of vehicle data sets including vehicle attributes for each of the plurality of vehicles; filtering the vehicle information based on the search query to obtain a result set and a partial match set; generating a web chart graphic based on the search query, the result set, and the partial match set by: generating axes corresponding to condition queries of the search query, the condition queries being from among binary queries, range queries, or optional queries, generating magnitudes for each of the axes based on attributes of the condition queries and connection lines between adjacent magnitudes of axes, generating first indicators of vehicles, of the plurality of vehicles, included in the result set that match both the binary queries and the range queries of the search query, generating second indicators of vehicles, of the plurality of vehicles, included in the partial match set that match the optional queries of the search query, and forming the web chart graphic by combining the axes, the magnitudes for each of the axes, the connection lines, the first indicators, and the second indicators; generating a search result message based on the result set, the partial match set, and the web chart graphic; and transmitting the search result message to the user device.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 1B-1D depict GUIs of a user device display/UI for filtering vehicle information, according to one or more embodiments.

DETAILED DESCRIPTION OF EMBODIMENTS

Various embodiments of the present disclosure relate generally to methods and systems for filtering vehicle information based on conditions and weights of a vehicle search request.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for filtering vehicle information based on conditions and weights of a vehicle search request. As discussed in more detail below, a system for filtering vehicle information may obtain weights for the attributes that the user wants to search on, and a search query can be constructed to match vehicles with specific attributes, allow vehicles with certain attributes within a range of specific attributes, and optionally include vehicles with other attributes. Therefore, the system may provide results that include vehicles that match the attributes that must be matched for the user, while also including vehicles that are similar to the attributes the user considers flexible. Furthermore, the user can then adjust the weights to change the results, thereby possibly identifying vehicles that are similar to the original search, as the user may determine the user is more flexible for certain attributes than the user originally determined.

Figure 1A:
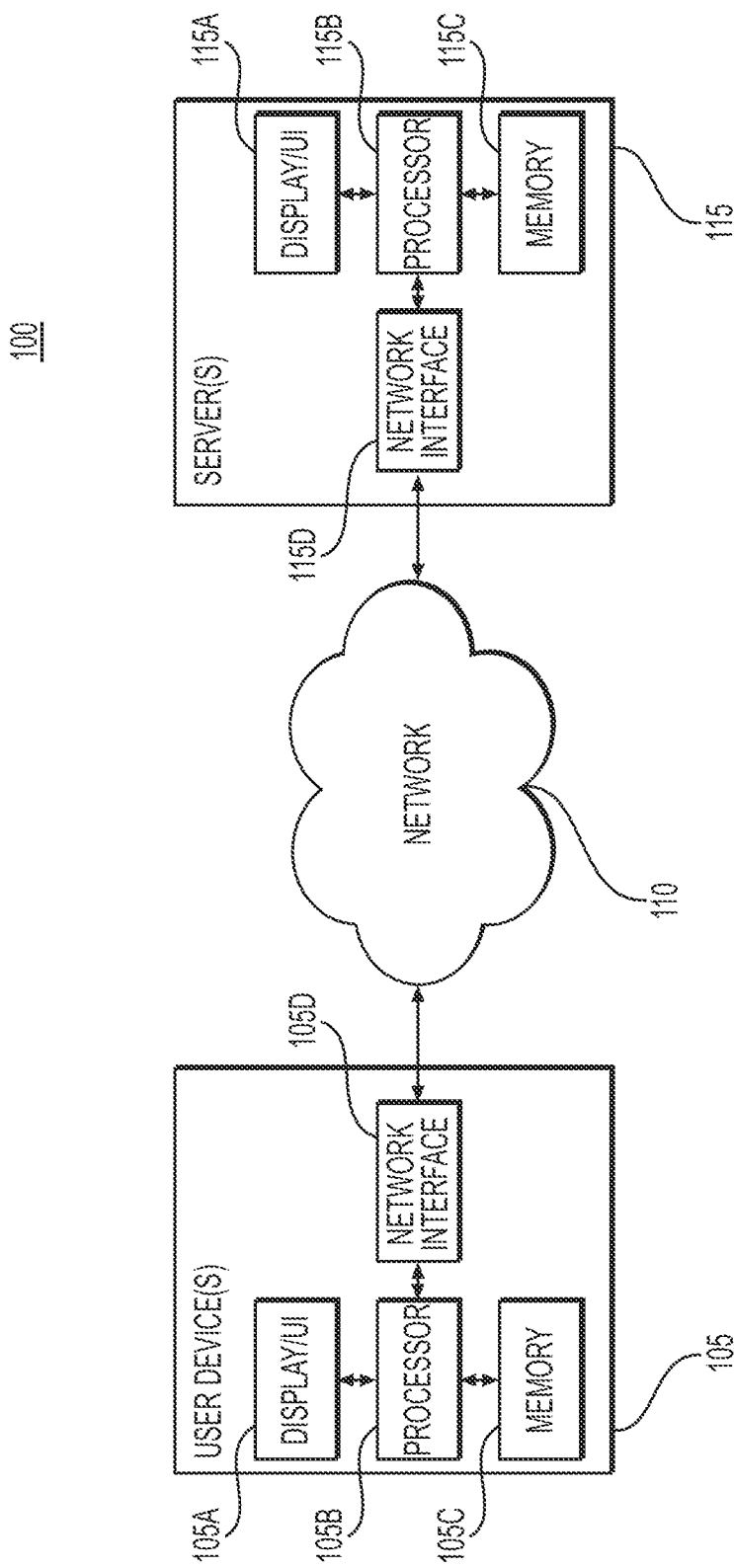
FIG. 1A depicts an exemplary system for filtering vehicle information, according to one or more embodiments.

FIG. 1A depicts an exemplary system 100 for filtering vehicle information, according to one or more embodiments. The system 100 may include one or more user device(s) 105, a network 110, and one or more server(s) 115. The user device 105 and the server 115 may be connected via the network 110, using one or more standard communication protocols. The network 110 may be one or a combination of the internet, a local network, or other network. The user device 105 and the server 115 may transmit and receive messages from each other across the network 110.

The user device 105 may include a display/UI 105A, a processor 105B, a memory 105C, and/or a network interface 105D. The user device 105 may be a computer, a cell phone, a tablet, etc. The user device 105 may execute, by the processor 105B, an operating system (O/S) and at least one application (each stored in memory 105C). The application may be a browser program or a mobile application program (which may also be a browser program in a mobile O/S). The application may generate one or more graphic user interfaces (GUIs) based on instructions/information stored in the memory 105C and/or instructions/information received from the server 115. The GUIs may, for instance, be webpages executed based on HTML, CSS, and/or scripts, such as JavaScript, but one skilled in the art would recognize that this may be accomplished by other methods, such as XML and Android programming languages or Objective-C/Swift. The display/UI 105A may be a touch screen or a display with other input systems (e.g., mouse, keyboard, etc.). The network interface 105D may be an TCP/IP network interface for, e.g., Ethernet or wireless communications with the network 110. The processor 1056, while executing the application, may receive user inputs from the display/UI 105A, and perform actions or functions in accordance with the application.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 1156, an operating system (O/S) and at least one instance of a vehicle search program (each stored in memory 115C). The memory 115C may also store vehicle information. The display/UI 115A may be a touch screen or a display with other input systems (e.g., mouse, keyboard, etc.) for an operator of the server 115 to control the functions of the server 115 (e.g., update the vehicle search program and/or the vehicle information). The network interface 115D may be an TCP/IP network interface for, e.g., Ethernet or wireless communications with the network 110.

The vehicle information may include a plurality of vehicle data sets. The plurality of the vehicle data sets may correspond to a plurality of vehicles, and each of the plurality of vehicle data sets may include vehicle attributes for each of the plurality of vehicles. The vehicle attributes for each of the plurality of vehicles may include one or a combination of: price information, fuel consumption information, vehicle color and/or material information, vehicle condition information, mileage and/or hours of operation information, location information, or features information. The vehicle attributes may also include one or a combination of vehicle make information, vehicle model information, vehicle trim information, vehicle body style information, vehicle engine, drivetrain, and/or transmission information, or vehicle fuel type information. The vehicle information may also include one or more images of the plurality of vehicles.

The vehicle search program may filter the vehicle information to obtain a result set. For instance, the vehicle search program may receive a vehicle search request from a user device. The vehicle search request may include conditions with corresponding weights as input by a user of the user device 105. For instance, the user of the user device 105 may select one or more conditions from a plurality of conditions, adjust the condition, and select weights for the conditions, such as depicted in FIG. 1B-1D, discussed below.

Figure 1B:
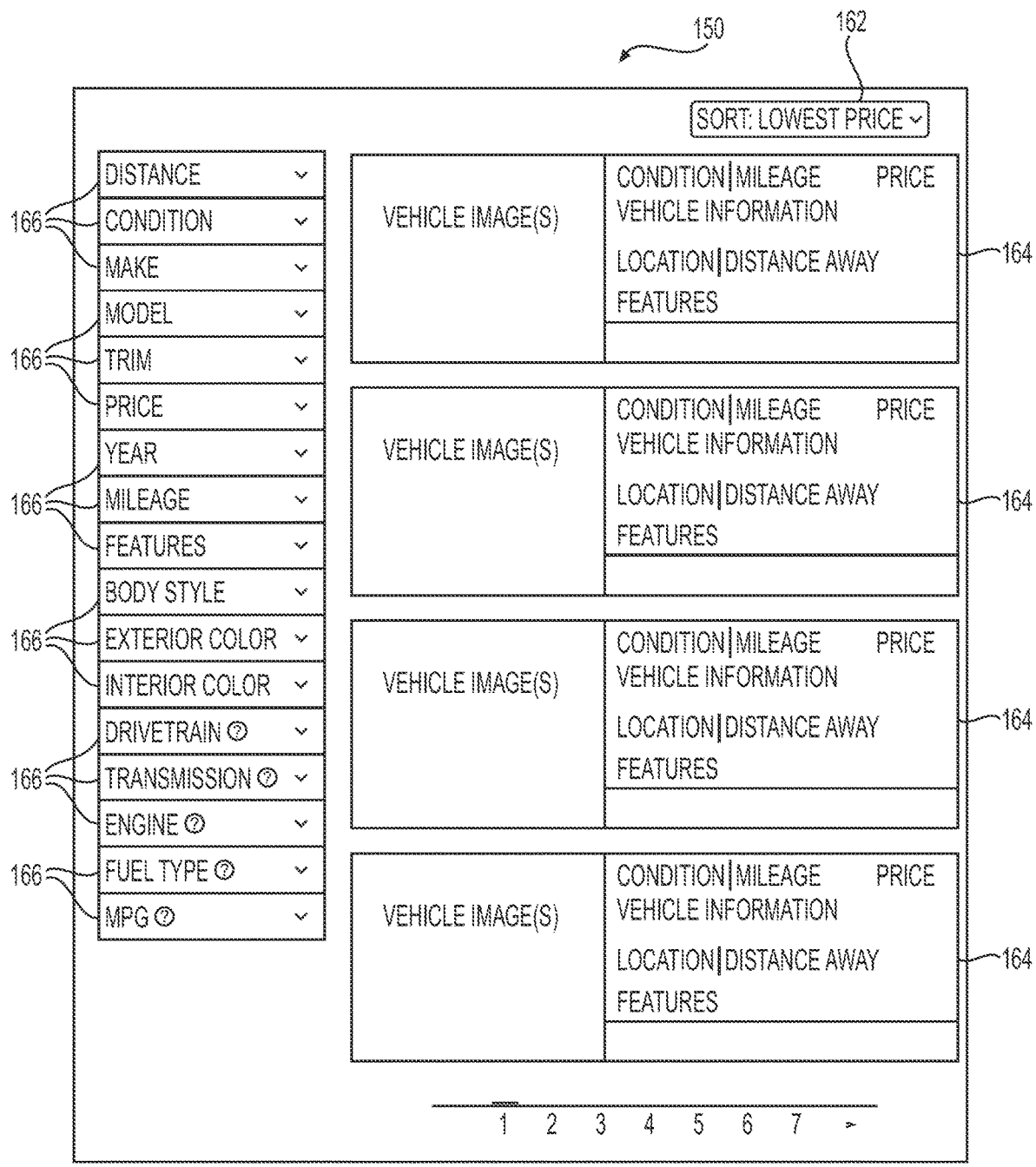
Figure 1C:
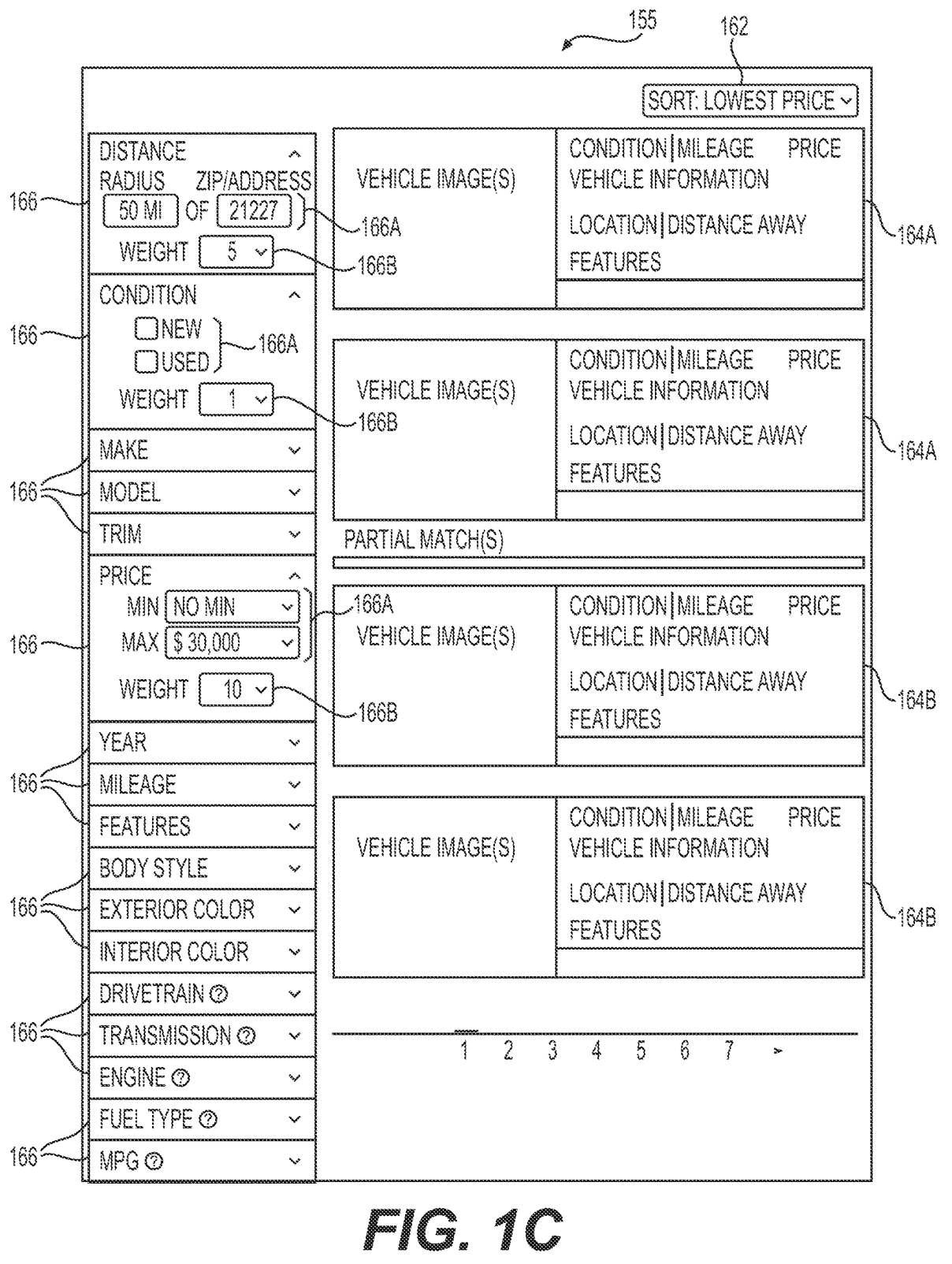
Figure 1D:
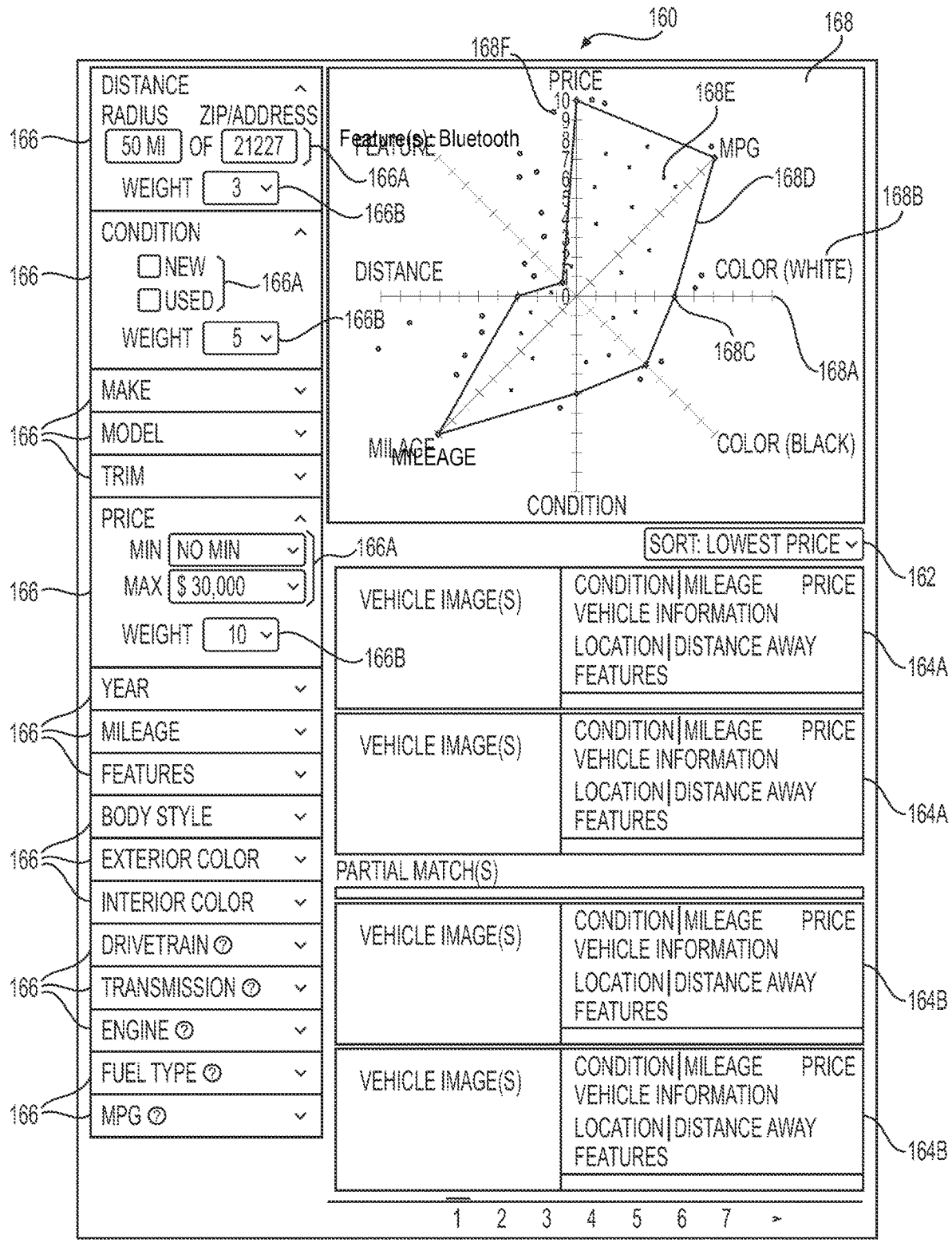

FIGS. 1B-1D depict GUIs of a user device display/UI for filtering vehicle information, according to one or more embodiments. Specifically, FIGS. 1B-1D may depict GUIs 150, 155, 160, respectively. The application may generate GUIs 150, 155, 160, or variations thereof, based on the instructions/information stored in the memory 105C and/or the instructions/information received from the server 115, such as a no match message or search result message, discussed below.

The GUI 150 may depict a first vehicle search GUI before any user inputs or any results are displayed. The GUI 150 may include a sort icon 162, one or more vehicles 164, and/or one or more attribute sections 166.

The sort icon 162 may display a current sort logic (e.g., sort by lowest price, highest price, lowest mileage, etc.) and may be selectable by the user of the user device 105 by a user input on a region associated with the sort icon 162 (e.g., a touch input). If the sort icon 162 is selected it may display a menu (not depicted) to change the current sort logic to a different sort logic based on another user input.

The one or more vehicles 164 may display one or more vehicles with vehicle attributes of the one or more vehicles. The one or more vehicles 164 may be selectable by the user of the user device 105 by a user input on a region associated with one of the one or more vehicles 164 (e.g., a touch input). If one of the one or more vehicles 164 is selected it may display a menu or another GUI (not depicted) to display images and/or vehicle attributes of the one of the one or more vehicles 164.

The one or more attribute sections 166 may correspond to the vehicle attributes described above and may display a text-string corresponding to the vehicle attributes. The one or more attribute sections 166 may be selectable by the user of the user device 105 by a user input on a region associated with the one or more attribute sections 166 (e.g., a touch input). The one or more attribute sections 166 may have a closed state and an open state. The closed state may depict only the text-string for the one or more attribute sections 166. The open state may depict the text-string, a condition input section 166A, and/or a condition weight input section 166B (see FIG. 1C) for the one or more attribute sections 166. If one of the one or more vehicles 164 is selected it may toggle between the closed state and the open state for the one or more attribute sections 166.

The GUI 155 may depict a second vehicle search GUI after/in response to user inputs for the condition input section 166A and/or the condition weight input section 166B, and/or after/in response to the user device 105 receiving search results. The GUI 155 may include the sort icon 162, one or more vehicles of a search result 164A and 164B (if search results have been received), and/or the one or more attribute sections 166 (in either closed or open states).

The condition input section 166A and the condition weight input section 166B for one or more attribute sections 166 may receive user inputs to create a vehicle search request. The vehicle search request may include one or more conditions and one or more weights for one or more attributes.

The conditions may include one or more value(s) and/or one or more logical operator(s). The values may be a discrete value or a continuous value. Discrete values may be for attributes that are discrete/binary in nature (e.g., color, condition). The continuous values may be for attributes that are continuous in nature (e.g., attributes based on a numerical value, such as price or distance). The logical operators may be true, false, greater than (or equal to), less than (or equal to), equal to, and, or (exclusive or inclusive), etc. For instance, based on user inputs, the conditions may be structured such that a first condition may be vehicle color is green must be true, and a second condition may be vehicle price must be less than (or equal to) $30,000 and more than (or equal to) $10,000. The one or more value(s) and/or one or more logical operator(s) may correspond to user inputs, described below with respect to the condition input section 166A.

For instance, the condition input section 166A may be a text input, a radio input, or a menu selection input. A text input may be a text area field in which the user of the user device 105 may input text, e.g., from a physical or virtual keyboard. A radio input may be selectable by the user to include vehicles of a certain attribute (e.g., new, used, a brand, a model). The menu selection input may be selectable by the user to include a lower or upper threshold value of an attribute. The menu selection input may provide common values to be selected or the user may input a text-string as a user-defined lower or upper threshold value.

For instance, as depicted in FIG. 1C, the condition input section 166A for a distance condition may be two text inputs to receive user-entered text related to a radius and a zip/address; the condition input section 166A for a condition of the vehicle condition may be radio inputs for new and/or used vehicles; the condition input section 166A for a price condition may be two menu selection inputs for a minimum and/or maximum price.

The condition input section 166A may be selectable by the user of the user device 105 by a user input on a region associated with the condition input section 166A (e.g., a touch input) to activate the condition. In response, the user may input text/select a radio change/select a change in lower or upper threshold for the attribute.

Once a condition is set for an attribute, the condition weight input section 166B may default to predefined value (e.g., 10 or 5). The condition weight input section 166B may be selectable by a user input on a region associated with the condition weight input section 166B (e.g., a touch input) to change the weight. If the condition weight input section 166B is selected, the user may input a value or select a value from a menu.

In response to a user input, e.g., on a search icon (not depicted) or in response to a user input to enter the search, the application may generate a vehicle search request message that includes the vehicle search request. The application may transmit the vehicle search request message to the server 115 using the network interface 105D. The vehicle search request may include the one or more conditions and/or the one or more weights for the one or more attributes. In one aspect of the disclosure, the one or more conditions and/or the one or more weights for the one or more attributes may be input by the user for the one or more attribute sections 166.

In another aspect of the disclosure, the one or more conditions and/or the one or more weights for the one or more attributes may be derived, by the server 115 by executing the vehicle search program and/or the user device 105 by executing the application, based on (1) a ranking or priority input by the user; (2) user's interaction(s) with the application; and/or (3) user responses to a survey or other chat bot program. The derived condition(s) and/or the derived weight(s) for the derived attribute(s) may be displayed to the user in the condition input section 166A and the condition weight input section 166B for one or more attribute sections 166, so that the user may adjust and/or confirm the derived condition(s) and/or the weight(s) for the attribute(s) so as to submit the vehicle search request.

For instance, to derive condition(s) and/or the weight(s) for the attribute(s) based on the ranking or the priority input by the user, the user may make selections by user inputs of one or more attributes, from among the attributes, and order the selected attributes in a ranked order or assign priorities to the selected attributes. Then the server 115/user device 105 may generate conditions and/or weights based on the ranked order or assigned priorities for the selected attributes.

For instance, to derive condition(s) and/or the weight(s) for the attribute(s) based on the user's interaction(s) with the application, the server 115/user device 105 may obtain user interaction information, and extract common attributes, common conditions, and/or common weights for the common attributes or common conditions. The user interaction information may include one or combinations of: (1) information about vehicles the user has viewed previously; (2) information about vehicles the user has saved; and/or (3) information about previous search requests the user submitted. The server 115/user device 105 may obtain the user interaction information; determine same or similar attributes from the information of viewed/saved vehicles or previous search requests; and generate conditions and/or weights for the same or similar attributes based on the information of viewed/saved vehicles or previous search requests.

For instance, to derive condition(s) and/or the weight(s) for the attribute(s) based on the user responses to the survey or other chat bot program, the server 115/user device 105 may display a GUI that includes one or more questions. The GUI that includes the one or more questions may display the one or more questions at a same time, sequentially, or in response to user inputs. The user may answer the one or more questions by inputting user inputs to the user device 105, and the server 115/user device 105 may generate conditions and/or weights for attributes based on the answer(s).

The processor 115B, while executing the vehicle search program, may receive the vehicle search request message from the network interface 115D and extract the vehicle search request. In response to receiving the vehicle search request, the processor 115G may form a search query based on the conditions and the weights of the vehicle search request. Then, the processor 115G may obtain the vehicle information. Then, the processor 115G may filter the vehicle information based on the search query to obtain a result set and a partial match set. Then, the processor may generate a search result message based on the result set and the partial match set. Then, the processor 115G may transmit the search result message to the user device 105, by using the network interface 115D.

To form a search query based on the conditions and the weights of the vehicle search request, the processor 115G, while executing the vehicle search program, may extract the conditions and the weights from the vehicle search request; obtain search query rules; and generate the search query by applying the search query rules to the conditions and the weights. To extract the conditions and the weights from the vehicle search request, the processor 115G may parse the vehicle search request according to a pre-defined format of the vehicle search request and store the conditions and the weights. To obtain search query rules, the processor 115G may access the memory 115C and retrieve the search query rules, or the search query rules may be incorporated into the vehicle search program.

In one aspect of the disclosure, the search query rules may define what condition queries each attribute of the one or more attribute sections 166 may form. Condition queries may be a binary query, a range query, an optional query, or a user-defined query.

The binary query may identify any vehicle data set, of the plurality of vehicle data sets, that has vehicle attributes that match the condition (e.g., return true for the value(s) and logical operator(s) of the condition). For instance, if the user input creates a binary query for price below $30,000, the binary query may identify all vehicle data sets, of the plurality of vehicle data sets, that has a price below $30,000.

The optional query may identify any vehicle data set, of the plurality of vehicle data sets, that has vehicle attributes that do not match the condition (e.g., return false for the value(s) and logical operator(s) of the condition) and do match other condition(s) (e.g., return true for the value(s) and logical operator(s) of the other condition(s)). For instance, if the user input creates an optional query for color (e.g., green) and a binary query for price below $30,000, the optional query may identify all vehicle data sets, of the plurality of vehicle data sets, that are not green, but do match the binary query for price. Therefore, the vehicle search program may return a result that is close to the search entered by the user, thereby informing the user of potentially acceptable vehicles.

The range query may identify any vehicle data set, of the plurality of vehicle data sets, that has vehicle attributes that are within a range of the condition (e.g., return true for the value(s) and logical operator(s) of the condition as modified by the range). For instance, if the user input creates a range query for price below $30,000, the range query may identify all vehicle data sets, of the plurality of vehicle data sets, that has a price below $32,000. Therefore, the vehicle search program may return a result that is close to the search entered by the user, thereby informing the user of potentially acceptable vehicles.

The range may be linearly proportional to the weight of the condition. Specifically, the range may be linearly proportional in either an increasing direction or decreasing direction based on the condition, such that the range is increasing or decreasing from a first threshold at the condition to a second threshold either above or below the first threshold. Specifically, if the condition is a maximum or a minimum condition, the range may raise the maximum or lower the minimum. For instance, in the case discussed above (the range query may identify all vehicle data sets, of the plurality of vehicle data sets, that has a price below $32,000), the first threshold may be $30,000, the range may be $2,000, and the second threshold may be $32,000.

The user-defined query may be a text-based search of the plurality of vehicle data sets for a vehicle attributes that match a user-entered text-string. The user may use the user-defined query to identify vehicles that have unique, rare, non-standard characteristics.

In another aspect of the disclosure, the search query rules may define what condition queries each attribute of the one or more attribute sections 166 may form, based on attribute types. The attribute types may include a first attribute type or a second attribute type. The first attribute type may be for attributes that are discrete/binary in nature (e.g., color, condition). The second attribute type may be for attributes that are continuous in nature (e.g., attributes based on a numerical value, such as price or distance).

To generate the search query by applying the search query rules to the conditions and the weights, the processor 115G may form condition queries for each of the conditions. To form the condition queries, the processor 115B may use the search query rules to form the condition queries based on attributes of the conditions and the weights. Specifically, when an attribute of a condition is a first attribute type, a condition query is a binary query if a weight is above/equal to a threshold or an optional query if the weight is below the threshold, and when the attribute of the condition is a second type of attribute, the condition query is a range query. Alternatively, when the attribute of the condition is the second type of attribute, the condition query is a range query if the weight is in between a low threshold and a high threshold, a binary query if above the high threshold, or an optional query if below the low threshold.

To filter the vehicle information based on the search query to obtain a result set and a partial match set, the processor 115B, while executing the vehicle search program, may apply the condition queries to the vehicle information to obtain vehicle data sets that match the binary queries, vehicle data sets that match the range queries, and/or vehicle data sets that match the optional queries. Then, the processor may select all identified vehicle data sets that match both binary queries and range queries of the search query for the result set, and select all identified vehicle data sets that match optional queries of the search query for the partial match set.

To generate a search result message based on the result set and the partial match set, the processor 115B, while executing the vehicle search program, may generate a match result set by sorting all the identified vehicle data sets that match both the binary queries and the range queries of the search query, generate a partial match result set by sorting all the identified vehicle data sets that match the optional queries of the search query, and generate a display based on the match result set and the partial match result set. The match result set and the partial match result set may correspond to the one or more vehicles of a search result 164A and 164B depicted in FIG. 1C.

The display may be information based on vehicle attributes and/or images for vehicles of the match result set and the partial match result set. The display may order the match result set above the partial match result set. The display may also include an indication of a number of partial matches. The number of partial matches may correspond to a number of vehicle data sets included in the partial match result set. The indication of the number of partial matches may include indicators of attributes. The indicators of attributes may correspond to conditions that vehicle data sets included in the partial match set do not match.

The processor 105B, while executing the application, may receive the search result message from the network interface 105D, generate an updated GUI, such as GUI 155 with the one or more vehicles of a search result 164A and 164B. As discussed above, the one or more vehicles of a search result 164A and 164B may correspond to vehicles of the result set 164A and vehicles of the partial match set 164B.

The GUI 160 may depict a third vehicle search GUI after/in response to user inputs for the condition input section 166A and/or the condition weight input section 166B, and/or after/in response to the user device 105 receiving search results. The GUI 160 may include the sort icon 162, the one or more vehicles of a search result 164A and 164B (if search results have been received), the one or more attribute sections 166 (in either closed or open states), and/or a web chart graphic 168.

To generate a search result message based on the result set and the partial match set, the processor 115B, while executing the vehicle search program, may also generate the web chart graphic 168.

To generate the web chart graphic 168, the processor 115B may obtain the search query, the result set, and the partial match set by. Then, the processor 115B may generate axes corresponding to condition queries of the search query. Then, the processor 115B may generate magnitudes for each of the axes based on attributes of the condition queries, and generate connection lines between adjacent magnitudes of axes. Then, the processor 115B may generate first indicators of vehicles. Then, the processor 115B may generate second indicators of vehicles. Then, the processor 115B may form the web chart graphic by combining the axes, the magnitudes for each of the axes, the connection lines, the first indicators, and the second indicators.

The axes may correspond to each of the condition queries of the search query, such that if there are more than two colors (white, black), or more than two features (e.g., rear view camera, Bluetooth), each of the colors or the features may have an axis. Alternatively, the axes may correspond to each of the condition queries of the search query, but with colors and/or features being grouped on a single axis, respectively. Alternatively, the axes may correspond to each of the condition queries of the search query, but with features being grouped by type (e.g., electronics, mechanical, premium features, etc., according to a classification system), and features of a same type be on a shared axis. The axes may be evenly arrayed around an origin, such that each axis may be separated by an angle. The angle may correspond to 360° divided by a number of axes displayed for the condition queries of the search query.

The magnitudes may be based on magnitude rules for each of the one or more attribute sections 166. For instance, the magnitudes rules may be based on attributes of the condition queries. Specifically, the magnitudes rules may determine whether an attribute of a condition is a first attribute type or a second attribute type. If the attribute of the condition is the first attribute type, the magnitude may correspond to a pre-defined value, as set by a step function based on the weight for the condition. If the attribute of the condition is the first second type, the magnitude may correspond to a proportional number of the value(s) of the condition. For instance, if the condition is price below $30,000, then the magnitude may be scaled to fit on a similar scale as other magnitudes. Alternatively, the magnitudes rules may set the magnitudes as equal to the weights of the conditions. The connection lines may be generated as straight lines between adjacent magnitudes of the axes.

The first indicators of vehicles may correspond vehicles, of the plurality of vehicles, included in the result set that match both the binary queries and the range queries of the search query. The first indicators may have locations on the web chart graphic. The locations for the first indicators may be within the connection lines of the web chart graphic. The locations for the first indicators may be evenly spaced or arbitrary, as the first indicators may be used to indicate how many vehicles are included in the result set. Alternatively, the locations for the first indicators may be set based on a common attributes of the vehicles included in the match result set, thereby indicating how many vehicle in the match result set are returning true for value(s) and logical operator(s).

The second indicators of vehicles may correspond to vehicles, of the plurality of vehicles, included in the partial match set that match the optional queries of the search query.

The second indicators may have locations on the web chart graphic. The locations for the second indicators may be outside the connection lines of the web chart graphic. The locations for the second indicators may be evenly spaced or arbitrary, as the second indicators may be used to indicate how many vehicles are included in the partial match set. Alternatively, the locations for the second indicators may be set based on a common attributes of the vehicles included in the partial match set, thereby indicating how many vehicles in the partial match set are returning false for value(s) and logical operator(s).

Alternatively, the second indicators of vehicles may correspond to vehicles, of the plurality of vehicles, that do not match any of the binary queries, the range queries, or the optional queries of the search query. In this case, the second indicators may be used to indicate how many vehicles not match any of the binary queries, the range queries, or the optional queries of the search query.

If the user device 105A receives a search result message that includes the web chart graphic (or instructions/information to generate a web chart graphic), the processor 105B may display the web chart graphic 168.

The web chart graphic 168 may include one or more axes 168A, labels 168B for the one or more axes, magnitudes 168C for each of the axes, connection lines 168D, first indicators 168E, and second indicators 168F. The labels 168B may be text-strings that correspond to attributes and/or value(s) of the condition queries. The first indicators 168E may be a same or different shape from a shape of the second indicators 168F.

After the user device 105 has displayed results of the vehicle search request, such as in GUI 155 or GUI 160, the user may decide to change the conditions (e.g., one of values and/or one of logical operator(s) of the conditions) and/or the weights, or to add conditions, or to remove conditions, etc. The user may input these changes to the condition input section 166A and/or the condition weight input section 166B for the one or more attribute sections 166. The processor 105B may receive the changes, and generate an updated vehicle search request. The processor 105B may transmit the updated vehicle search request to the server 115.

The processor 115b may receive the updated vehicle search request. If the processor 115b determines the updated vehicle search request has been received, the processor 115b may then proceed to obtain a partial match set and previous search query, based on an identification of the user device 105, an account of the user of the user device 105, or a session identification, etc.

The processor 115b may then proceed to adjust the previous search query based on the updated vehicle search request. The processor 115b may then proceed to filter the vehicle information based on the adjusted search query and the partial match set to obtain an updated result set and an updated partial match set. The processor 115b may perform the filtering by applying any updated/new condition queries on the previous result set and the previous partial match set first, so that a first search result message may be transmitted before all of the vehicles in the vehicle information are also filtered (and a second vehicle search result message may be transmitted). Therefore, the server 115 may reduce user wait time.

FIG. 2A-2D depict flowcharts for filtering vehicle information, according to one or more embodiments.

Figure 2A:
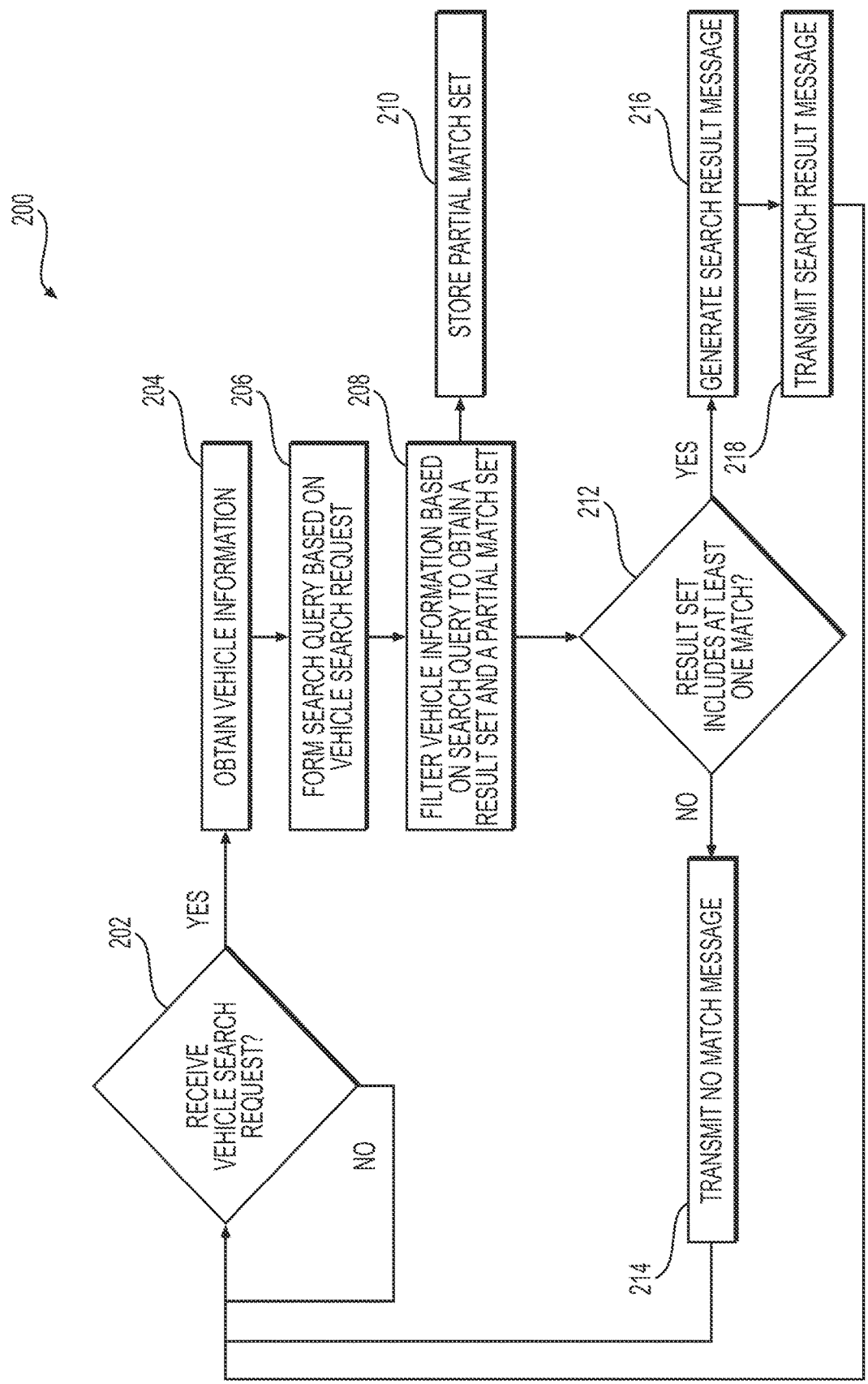
FIG. 2A-2D depict flowcharts for filtering vehicle information, according to one or more embodiments.

FIG. 2A depicts a flowchart 200. The flowchart 200 may depict a process to filter vehicle information, to thereby provide search results to a user device. The flowchart 200 may be performed by one of the server(s) 115, discussed above, by executing the vehicle search program. The server 115 may start the process of the vehicle search program illustrated by flowchart 200 to determine whether a vehicle search request has been received from a user device 105 (block 202). If not (block 202: No), the server 115 may proceed to wait until the server 115 receives the vehicle search request (block 202).

If the server 115 determines the vehicle search request has been received (bock 202: Yes), the server 115 may then proceed to obtain vehicle information (block 204).

The server 115 may then proceed to form a search query based on the vehicle search request (block 206).

The server 115 may then proceed to filter the vehicle information based on the search query to obtain a result set and a partial match set (block 208).

The server 115 may then proceed to store the partial match set (block 210). The server 115 may also then proceed to determine whether the result set includes at least one match (block 212). If not (block 212: No), the server 115 may proceed to transmit a no match message to the user device 105 (block 214). The server 115 may then proceed to wait until the server 115 receives another vehicle search request (block 202), and perform the same process or a process described in FIG. 3 below.

If the server 115 determines the result set includes at least one match (bock 212: Yes), the server 115 may then proceed to generate a search result message (block 216).

The server 115 may then proceed to transmit the search result message (block 218). The server 115 may then proceed to wait until the server 115 receives another vehicle search request (block 202), and perform the same process or the process described in FIG. 3 below.

Figures 2B, 2C:
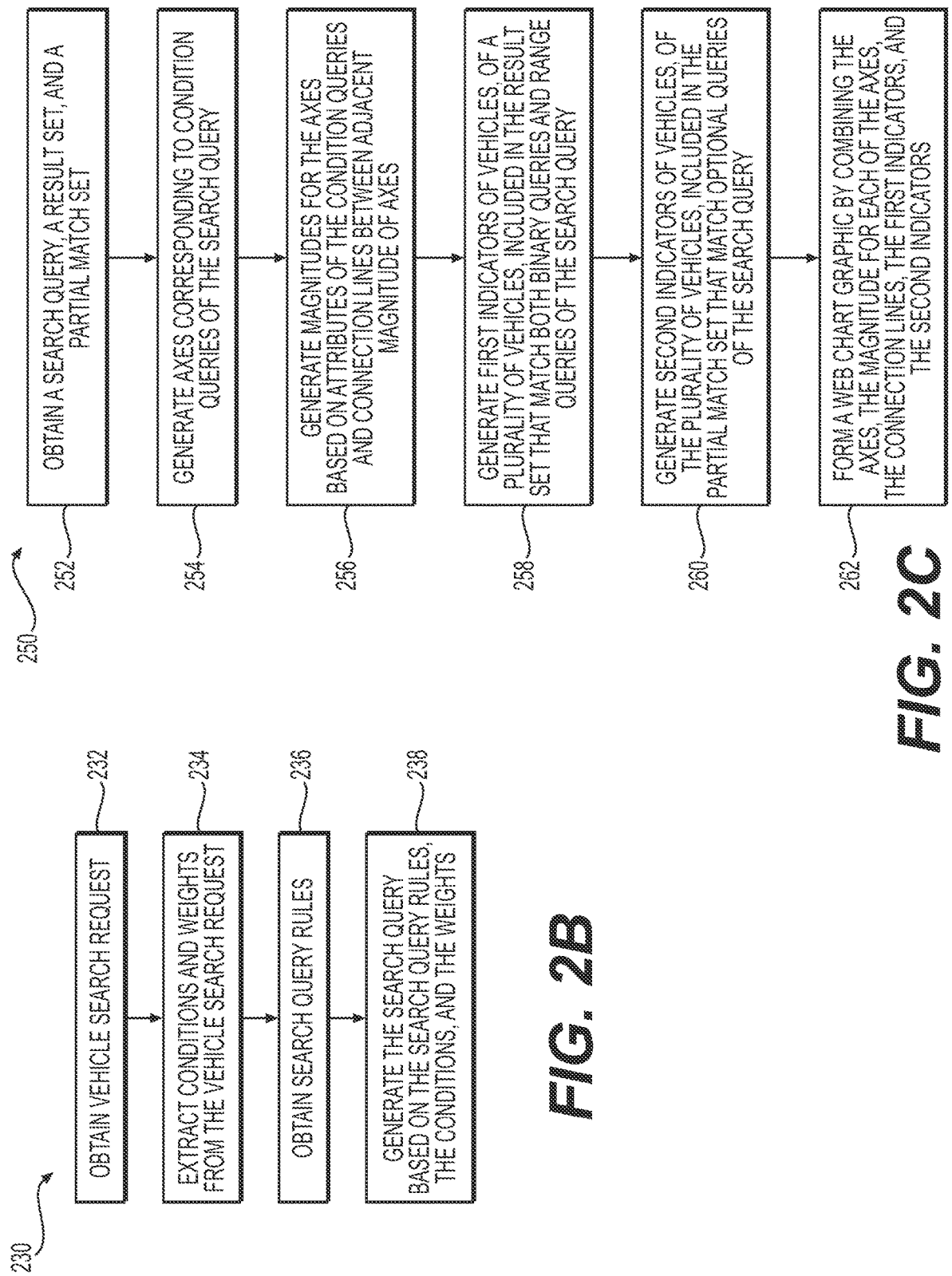

FIG. 2B depicts a flowchart 230. The flowchart 230 may depict a process to form the search query based on the vehicle search request, as discussed above with respect to block 206 of FIG. 2A. The flowchart 230 may be performed by one of the server(s) 115, discussed above, by executing the vehicle search program. The server 115 may start the process of the vehicle search program illustrated by flowchart 230 to obtain a vehicle search request (block 232).

The server 115 may then proceed to extract conditions and weights from the vehicle search request (block 234).

The server 115 may then proceed to obtain search query rules (block 236). The search query rules may be the search query rules described above with respect to FIG. 1.

The server 115 may then proceed to generate a search query based on the search query rules, the conditions, and the weights (block 238).

FIG. 2C depicts a flowchart 250. The flowchart 250 may depict a process to generate a web chart graphic as a part of the process to generate the search result message, as discussed above with respect to block 216 of FIG. 2A. An example web chart graphic may be the web chart graphic 168 depicted in FIG. 1D. The flowchart 250 may be performed by one of the server(s) 115, discussed above, by executing the vehicle search program. The server 115 may start the process of the vehicle search program illustrated by flowchart 250 to obtain a search query, a result set, and a partial match set (block 252).

The server 115 may then proceed to generate axes corresponding to condition queries of the search query (block 254).

The server 115 may then proceed to generate magnitudes the axes based on attributes of the condition queries, and generate connection lines between adjacent magnitudes of axes (block 256).

The server 115 may then proceed to generate first indicators of vehicles, of a plurality of vehicles, included in the result set that match both binary queries and range quires (block 258).

The server 115 may then proceed to generate second indicators of vehicles, of the plurality of vehicles, included in the partial match set that match optional queries (block 260).

The server 115 may then proceed to form a web chart graphic by combining the axes, the magnitude for each of the axes, the connection lines, the first indicators, and the second indicators (block 262).

Figure 2D:
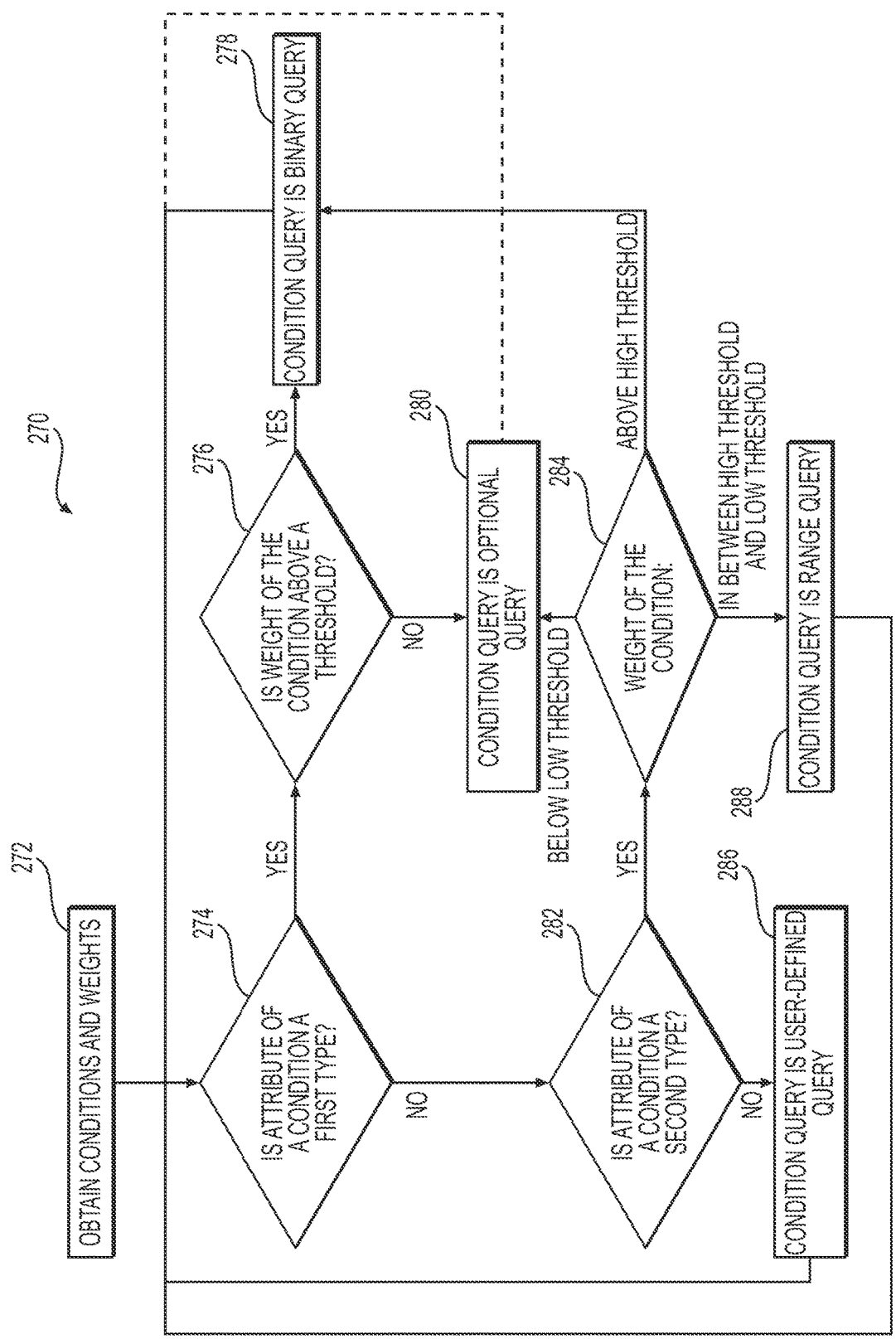

FIG. 2D depicts a flowchart 270. The flowchart 270 may depict a process to generate a search query based on the search query rules for conditions and weights of a vehicle search request, as discussed above with respect to block 238 of FIG. 2B. The flowchart 270 may be performed by one of the server(s) 115, discussed above, by executing the vehicle search program. The server 115 may start the process of the vehicle search program illustrated by flowchart 270 to obtain conditions and weights of a vehicle search request (block 272).

The server 115 may then proceed to determine whether an attribute of a condition is a first type (block 274). Specifically, the server 115 may select one condition from among the conditions, to thereby form a condition query for that condition, and the server 115 may continue to select conditions until no more conditions are left to form condition queries.

If the server 115 determines the attribute of the condition is the first type (bock 274: Yes), the server 115 may then proceed to determine whether a weight of the condition is above a threshold (block 276). If the server 115 determines the weight of the condition is above the threshold (bock 276: Yes), the server 115 may then proceed to determine the condition query is a binary query (block 278). If the server 115 determines the weight of the condition is below the threshold (bock 276: No), the server 115 may then proceed to determine the condition query is an optional query (block 280). The server 115 may then proceed to a next condition and weight, or finish the process if no other conditions/weights remain.

If the server 115 determines the attribute of the condition is not the first type (block 274: No), the server 115 may proceed to determine whether the attribute of the condition is a second type (block 282). If the server 115 determines the attribute of the condition is the second type (bock 282: Yes), the server 115 may then proceed to determine whether the weight of the condition is below a low threshold, above a high threshold, or in between the high threshold and the low threshold (block 284).

If the server 115 determines the weight of the condition is below a low threshold (bock 284: Below Low Threshold), the server 115 may then proceed to determine the condition query is the optional query (block 280). If the server 115 determines the weight of the condition is above the high threshold (bock 284: Above High Threshold), the server 115 may then proceed to determine the condition query is the binary query (block 278). If the server 115 determines the weight of the condition is in between the high threshold and the low threshold (bock 284: In Between High Threshold and Low Threshold), the server 115 may then proceed to determine the condition query is a range query (block 278). The server 115 may then proceed to the next condition and weight, or finish the process if no other conditions/weights remain.

If the server 115 determines the attribute of the condition is not the second type (block 274: No), the server may determine the condition query is a user-defined query (block 286). The server 115 may then proceed to the next condition and weight, or finish the process if no other conditions/weights remain.

Figure 3:
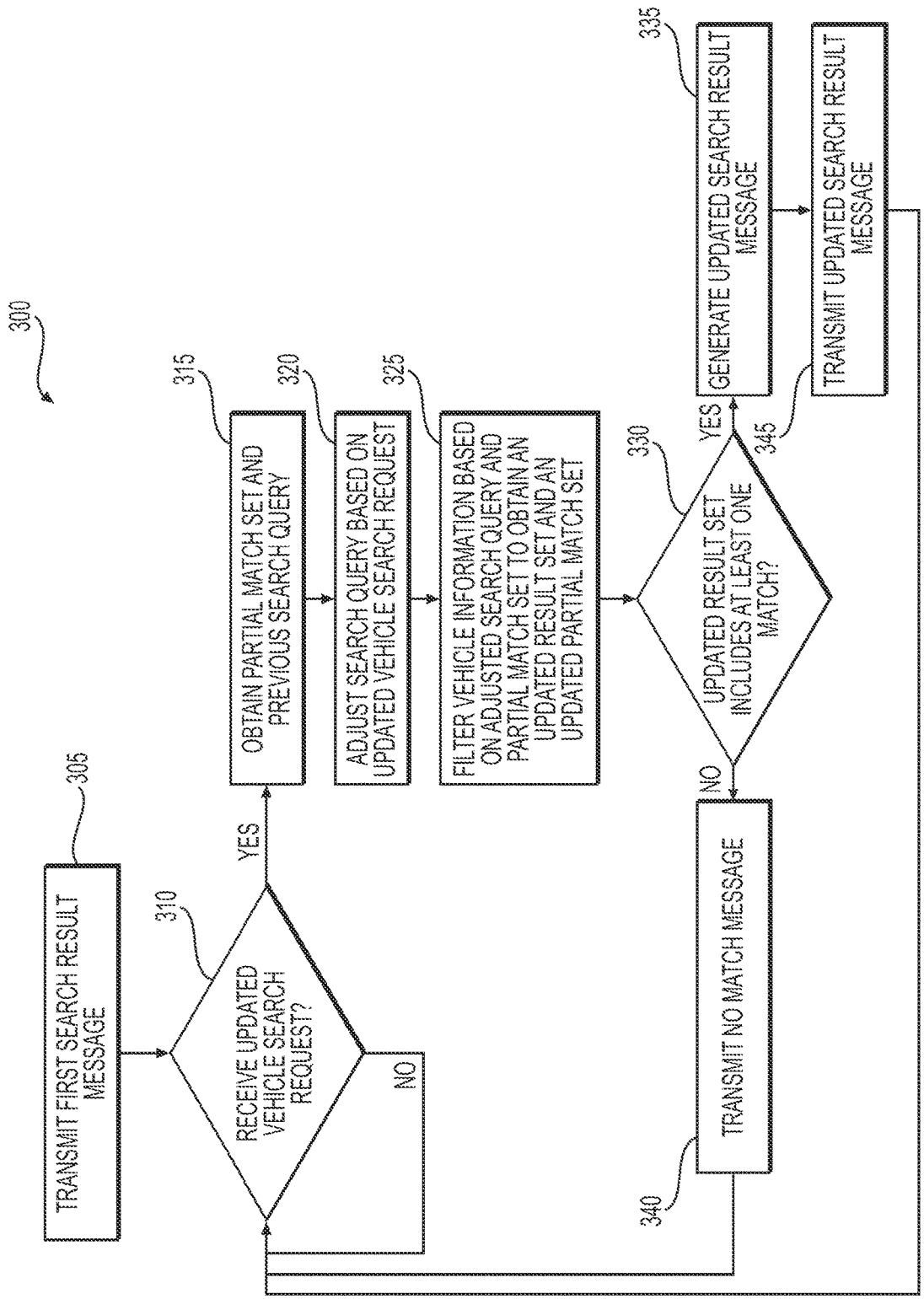
FIG. 3 depicts a flowchart for filtering vehicle information, according to one or more embodiments.

FIG. 3 depicts a flowchart 300 for filtering vehicle information, according to one or more embodiments. The flowchart 300 may be performed by one of the server(s) 115, discussed above, by executing the vehicle search program. The server 115 may start the process of the vehicle search program illustrated by flowchart 300 to transmit a first search result message to a user device 105 (block 305).

The server 115 may then proceed to determine whether an updated vehicle search request has been received from the user device 105 (block 310). If not (block 310: No), the server 115 may proceed to wait until the server 115 receives the updated vehicle search request (block 310).

If the server 115 determines the updated vehicle search request has been received (bock 310: Yes), the server 115 may then proceed to obtain a partial match set and previous search query (block 315).

The server 115 may then proceed to adjust the previous search query based on the updated vehicle search request (block 320).

The server 115 may then proceed to filter the vehicle information based on the adjusted search query and the partial match set to obtain an updated result set and an updated partial match set (block 325).

The server 115 may then proceed to determine whether the updated result set includes at least one match (block 330). If not (block 330: No), the server 115 may proceed to transmit a no match message to the user device 105 (block 340). The server 115 may then proceed to wait until the server 115 receives the updated vehicle search request (block 310).

If the server 115 determines the updated result set includes at least one match (bock 330: Yes), the server 115 may then proceed to generate an updated search result message (block 335).

The server 115 may then proceed to transmit an updated search result message (block 345). The server 115 may then proceed to wait until the server 115 receives the updated vehicle search request (block 310).

Figure 4:
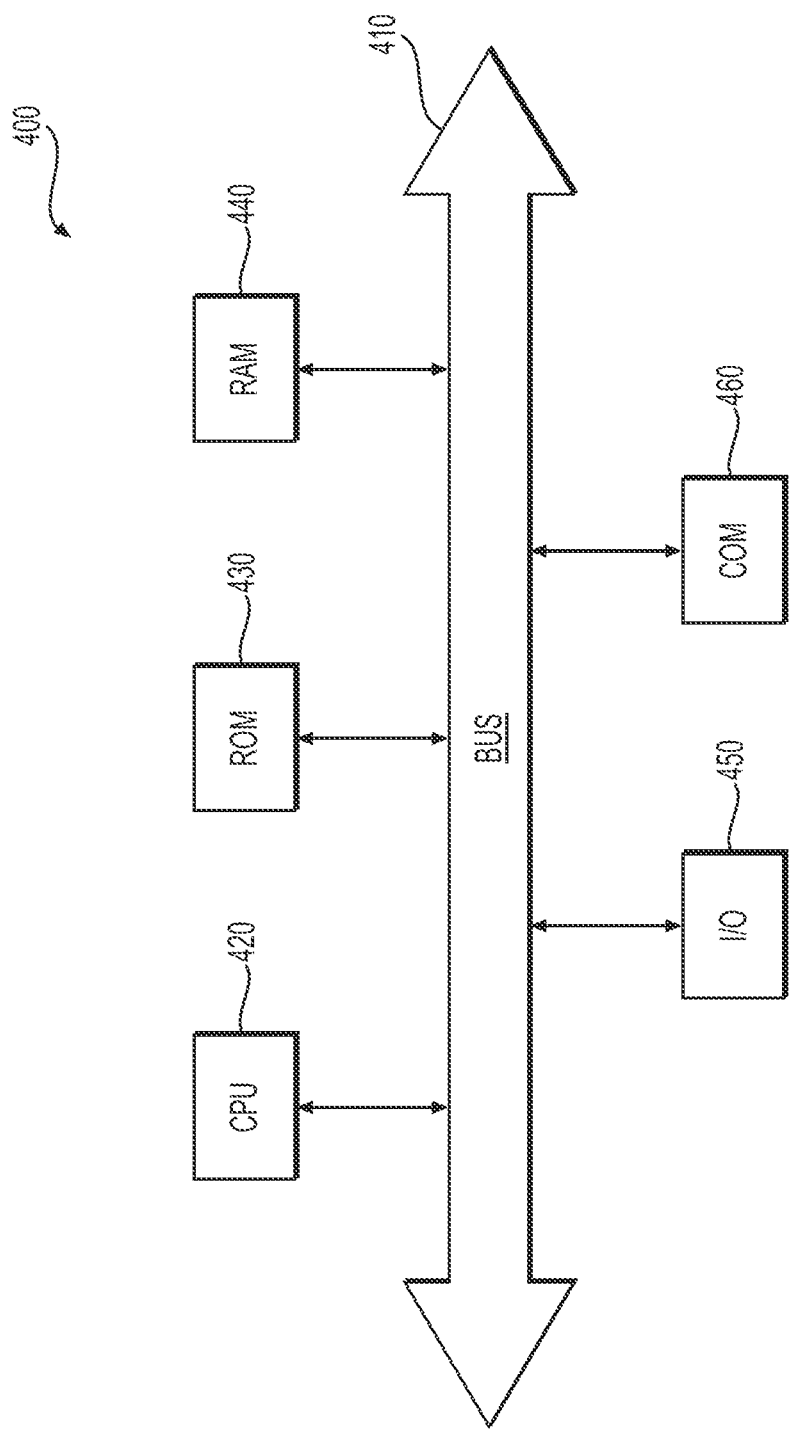
FIG. 4 depicts an example system that may execute techniques presented herein.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for filtering vehicle information, comprising:
receiving a vehicle search request, the vehicle search request including a condition with a corresponding weight for a given attribute;
forming a query type for the vehicle search request, wherein the query type is based on comparing the corresponding weight against a high threshold and a low threshold, and wherein the query type is formed as a range query when the corresponding weight is between the high threshold and the low threshold, for the given attribute;
determining one of an increasing direction or a decreasing direction of the range query based on one of the condition or the given attribute, wherein:
an increasing direction is determined based on the condition or the given attribute being a maximum value, and
a decreasing direction is determined based on the condition being a minimum value;
determining an adjusted value for the condition based on the corresponding weight, wherein the adjusted value is linearly proportional to the corresponding weight;
determining a condition range based on the adjusted value, wherein:
in response to the increasing direction being determined, the condition range is determined by increasing the condition based on the adjusted value, and
in response to the decreasing direction being determined, the condition range is determined by decreasing the condition based on the adjusted value;
applying a search query for the given attribute to a vehicle data set based on the condition range, wherein the search query returns one or more vehicle information for vehicles that have vehicle attributes that return true for the condition range; and
transmitting the one or more vehicle information.

2. The method of claim 1, wherein the vehicle data set is selected from a plurality of vehicle data sets, the plurality of the vehicle data sets corresponding to a plurality of vehicles, each of the plurality of vehicle data sets including vehicle attributes for each of a plurality of vehicles.

3. The method of claim 2, wherein the vehicle attributes for each of the plurality of vehicles includes one or a combination of: price information, fuel consumption information, vehicle color and/or material information, vehicle condition information, mileage and/or hours of operation information, location information, or features information.

4. The method of claim 1, wherein the search query generated is based on:
extracting the condition and the weight from the vehicle search request;
obtaining search query rules; and
generating the search query by applying the search query rules to the condition and the weight.

5. The method of claim 1, wherein the one or more vehicles returned by applying the search query based on the condition range correspond to a partial match set and further comprising:
applying a second search query for the given attribute to a vehicle data set based on the condition, wherein the second search query returns a result set comprising one or more second vehicle information for second vehicles that have vehicle attributes that return true for the condition.

6. The method of claim 5, further comprising:
generating a web chart graphic based on the result set and the partial match set by:
generating first indicators of the second vehicles included in the result set;
forming the web chart graphic based on the first indicators; and
generating a search result message based on the web chart graphic, the result set, and the partial match set.

7. The method of claim 1, wherein the vehicle search request is received from a user device and the one or more vehicle information is transmitted to the user device.

8. The method of claim 1, wherein the high threshold and the low threshold for the given attribute is based on a type of given attribute.

9. The method of claim 1, further comprising generating a search result message including the one or more vehicle information.

10. The method of claim 9, further comprising causing the search result message to be displayed using a graphical user interface (GUI).

11. The method of claim 1, wherein the condition and the weight are derived based on (1) a ranking or priority input by a user; (2) user interaction(s) with a user device; and/or (3) user response(s) to a survey or other chat bot program.

12. A system for filtering vehicle information, the system comprising:
a memory storing instructions; and
a processor executing the instructions to perform a process including:
receiving a vehicle search request, the vehicle search request including a condition with a corresponding weight for a given attribute;
forming a query type for the vehicle search request, wherein the query type is based on comparing the corresponding weight against a threshold range, and wherein the query type is formed as a range query when the corresponding weight falls within the threshold range;
determining one of an increasing direction or a decreasing direction of the range query based on one of the condition or the given attribute, wherein:
an increasing direction is determined based on the condition or the given attribute being a maximum value, and
a decreasing direction is determined based on the condition or the given attribute being a minimum value;
determining an adjusted value for the condition based on the corresponding weight, wherein the adjusted value is linearly proportional to the corresponding weight;
determining a condition range based on the adjusted value, wherein:
in response to the increasing direction being determined, the condition range is determined by increasing the condition based on the adjusted value, and
in response to the decreasing direction being determined, the condition range is determined by decreasing the condition based on the adjusted value;
applying a search query for the given attribute to a vehicle data set based on the condition range, wherein the search query returns one or more vehicle information for vehicles that have vehicle attributes that return true for the condition range; and
transmitting the one or more vehicle information.

13. The system of claim 12, wherein the vehicle data set is selected from a plurality of vehicle data sets, the plurality of the vehicle data sets corresponding to a plurality of vehicles, each of the plurality of vehicle data sets including vehicle attributes for each of a plurality of vehicles.

14. The system of claim 12, wherein the vehicle attributes for each of a plurality of vehicles includes one or a combination of: price information, fuel consumption information, vehicle color and/or material information, vehicle condition information, mileage and/or hours of operation information, location information, or features information.

15. The system of claim 12, wherein the search query generated is based on:
extracting the condition and the weight from the vehicle search request;
obtaining search query rules; and
generating the search query by applying the search query rules to the condition and the weight.

16. The system of claim 12, wherein the one or more vehicles returned by applying the search query based on the condition range correspond to a partial match set and wherein the instructions further include:
applying a second search query for the given attribute to a vehicle data set based on the condition, wherein the second search query returns a result set comprising one or more second vehicle information for second vehicles that have vehicle attributes that return true for the condition.

17. The system of claim 16, wherein the instructions further include:
generating a web chart graphic based on the result set and the partial match set by:
generating first indicators of the second vehicles included in the result set;
forming the web chart graphic based on the first indicators; and
generating a search result message based on the web chart graphic, the result set, and the partial match set.

18. The system of claim 12, wherein a high threshold and a low threshold for the given attribute is based on a type of given attribute.

19. The system of claim 12, further comprising generating a search result message including the one or more vehicle information.

20. A method for filtering vehicle information, the method comprising:
- receiving a user input from a user device based on user response to a survey or chat bot program;
- deriving a vehicle search request having a condition with corresponding weight for a given attribute, based on the user input;
- determining the given attribute is a first attribute type of a plurality of attribute types;
- forming a range query based on the given attribute being the first attribute type and further based on the corresponding weight being between a high threshold and a low threshold;
- determining an adjusted value for the condition based on the corresponding weight, wherein the adjusted value is linearly proportional to the corresponding weight;
- determining a condition range based on the adjusted value by modifying the condition by the adjusted value, wherein the condition range is increased based on the adjusted value based on the condition range being configured in an increasing direction, and wherein the condition range is decreased based on the adjusted value based on the condition range being configured in a decreasing direction;
- applying a search query for the given attribute to a vehicle data set based on the condition range, wherein the search query returns one or more vehicle information for vehicles that have vehicle attributes that return true for the condition range; and transmitting the one or more vehicle information.

* * * * *